United States Patent
Kishimoto et al.

(10) Patent No.: US 9,824,308 B2
(45) Date of Patent: Nov. 21, 2017

(54) INFORMATION PROCESSING APPARATUS, IMAGE READING APPARATUS, CODE IMAGE GENERATION APPARATUS, AND NON-TRANSITORY COMPUTER READABLE MEDIUM

(71) Applicant: FUJI XEROX CO., LTD., Tokyo (JP)

(72) Inventors: Hiroyuki Kishimoto, Kanagawa (JP); Shigeru Okada, Kanagawa (JP); Katsuya Koyanagi, Kanagawa (JP); Kunihiko Kobayashi, Kanagawa (JP); Shintaro Adachi, Kanagawa (JP); Akane Yoshizaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 4 days.

(21) Appl. No.: 15/097,025

(22) Filed: Apr. 12, 2016

(65) Prior Publication Data

US 2017/0177986 A1    Jun. 22, 2017

(30) Foreign Application Priority Data

Dec. 22, 2015 (JP) ................................. 2015-249542

(51) Int. Cl.
    *G06K 19/06*    (2006.01)

(52) U.S. Cl.
    CPC .............................. *G06K 19/06037* (2013.01)

(58) Field of Classification Search
    USPC ........................................................ 235/435
    See application file for complete search history.

(56) References Cited

U.S. PATENT DOCUMENTS

| | | | | |
|---|---|---|---|---|
| 5,837,986 A | * | 11/1998 | Barile | G06F 3/002 235/462.01 |
| 5,992,748 A | | 11/1999 | Takahashi et al. | |
| 8,339,622 B2 | * | 12/2012 | Sato | G06K 15/1856 235/375 |
| 2002/0060246 A1 | * | 5/2002 | Gobburu | G06Q 20/04 235/462.46 |
| 2005/0224572 A1 | * | 10/2005 | Kelley | G06F 17/243 235/375 |
| 2007/0176000 A1 | * | 8/2007 | Cattrone | G06K 1/121 235/462.01 |
| 2008/0000991 A1 | * | 1/2008 | Yin | G06K 1/123 235/494 |

FOREIGN PATENT DOCUMENTS

JP            H10-55420 A       2/1998

* cited by examiner

*Primary Examiner* — Michael G Lee
*Assistant Examiner* — David Tardif
(74) *Attorney, Agent, or Firm* — Oliff PLC (57) ABSTRACT

An information processing apparatus includes an obtaining unit and a replacing unit. The obtaining unit obtains one or more pieces of information obtained from a code image included in a read image of a document. The replacing unit replaces at least one piece of information among the one or more pieces of information obtained by the obtaining unit with another piece of information that is associated in advance with the at least one piece of information and that has a larger amount of information than an amount of information of the at least one piece of information.

12 Claims, 8 Drawing Sheets

7A {
SENDER: taro.sato, FIFTH DEVELOPMENT DEPARTMENT, DEVELOPMENT SECTION,
DESTINATION: ¥¥AAA.BB.CCC.AA/work/testFolder, cccccc.dddddd@AAABB.co.jp, aaaaaa.bbbbbb@AAABB.co.jp,
DOCUMENT TYPE: PERSONAL SEAL REGISTRATION CERTIFICATE

FIG. 7B

7B {
SENDER: #cnt5# taro.sato,
DESTINATION: #mona#testFolder#29407#00000#,
DOCUMENT TYPE: #k2#

FIG. 8

INFORMATION PROCESSING APPARATUS, IMAGE READING APPARATUS, CODE IMAGE GENERATION APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-249542 filed Dec. 22, 2015.

BACKGROUND

Technical Field

The present invention relates to an information processing apparatus, an image reading apparatus, a code image generation apparatus, and a non-transitory computer readable medium.

SUMMARY

According to an aspect of the invention, there is provided an information processing apparatus including an obtaining unit and a replacing unit. The obtaining unit obtains one or more pieces of information obtained from a code image included in a read image of a document. The replacing unit replaces at least one piece of information among the one or more pieces of information obtained by the obtaining unit with another piece of information that is associated in advance with the at least one piece of information and that has a larger amount of information than an amount of information of the at least one piece of information.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described in detail below with reference to the attached drawings.

Figure 1:
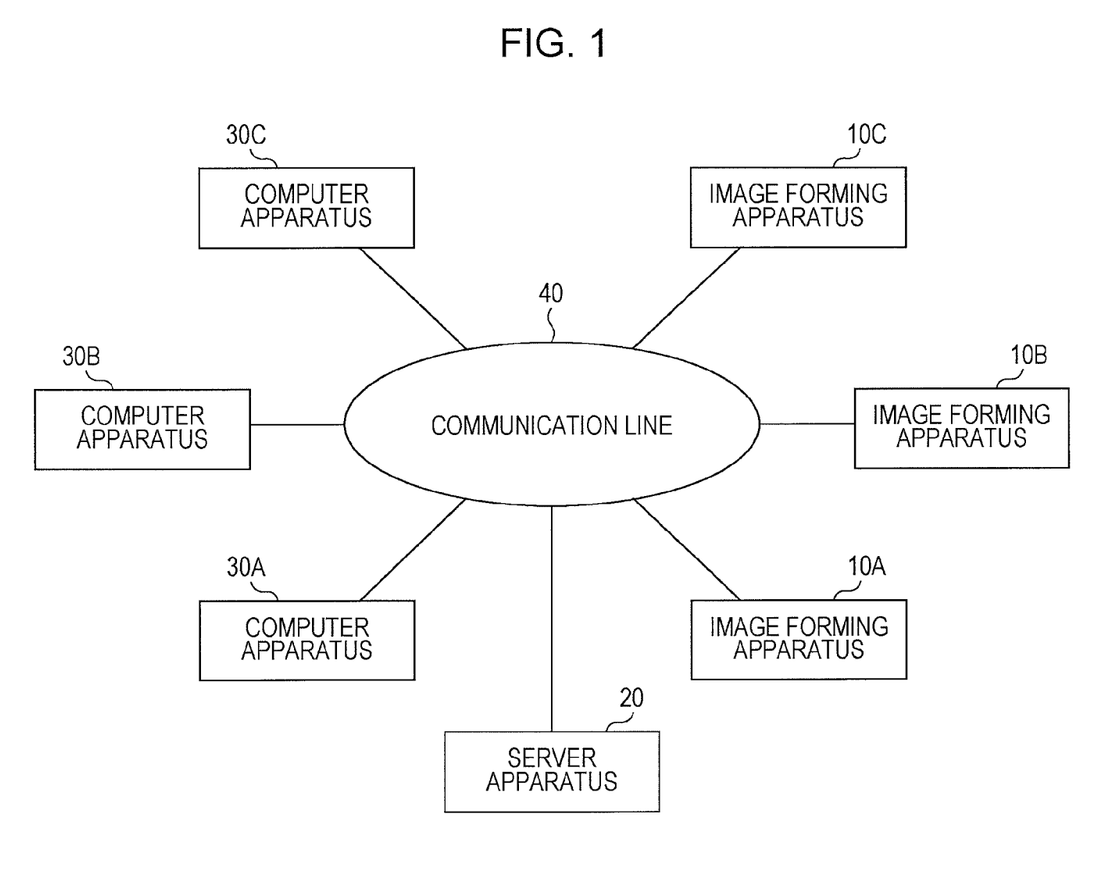
FIG. 1 is a diagram illustrating an overall configuration.

FIG. 1 is a diagram illustrating an overall configuration of an exemplary embodiment of the present invention. In this exemplary embodiment, plural image forming apparatuses 10A to 100, a server apparatus 20, and plural computer apparatuses 30A to 30C are provided. The apparatuses are connected to a communication line 40 and communicate with one another via the communication line 40.

The image forming apparatus 10A to 10C each include an image reading unit that reads an image on a document, an image forming unit that forms an image on a sheet, which is an example of a recording material, and so on.

The image reading unit is constituted by a scanner and reads a document loaded by a user. The image forming unit forms an image on a sheet on the basis of an image read by the image reading unit or image data transmitted from any of the computer apparatuses 30A to 30C.

The computer apparatuses 30A to 30C are each constituted by a personal computer (PC) and are used by a user.

In this exemplary embodiment, the three computer apparatuses 30A to 30C and the three image forming apparatuses 10A to 10C are illustrated; however, the number of computer apparatuses and that of the image forming apparatuses need not be three.

Figure 2:
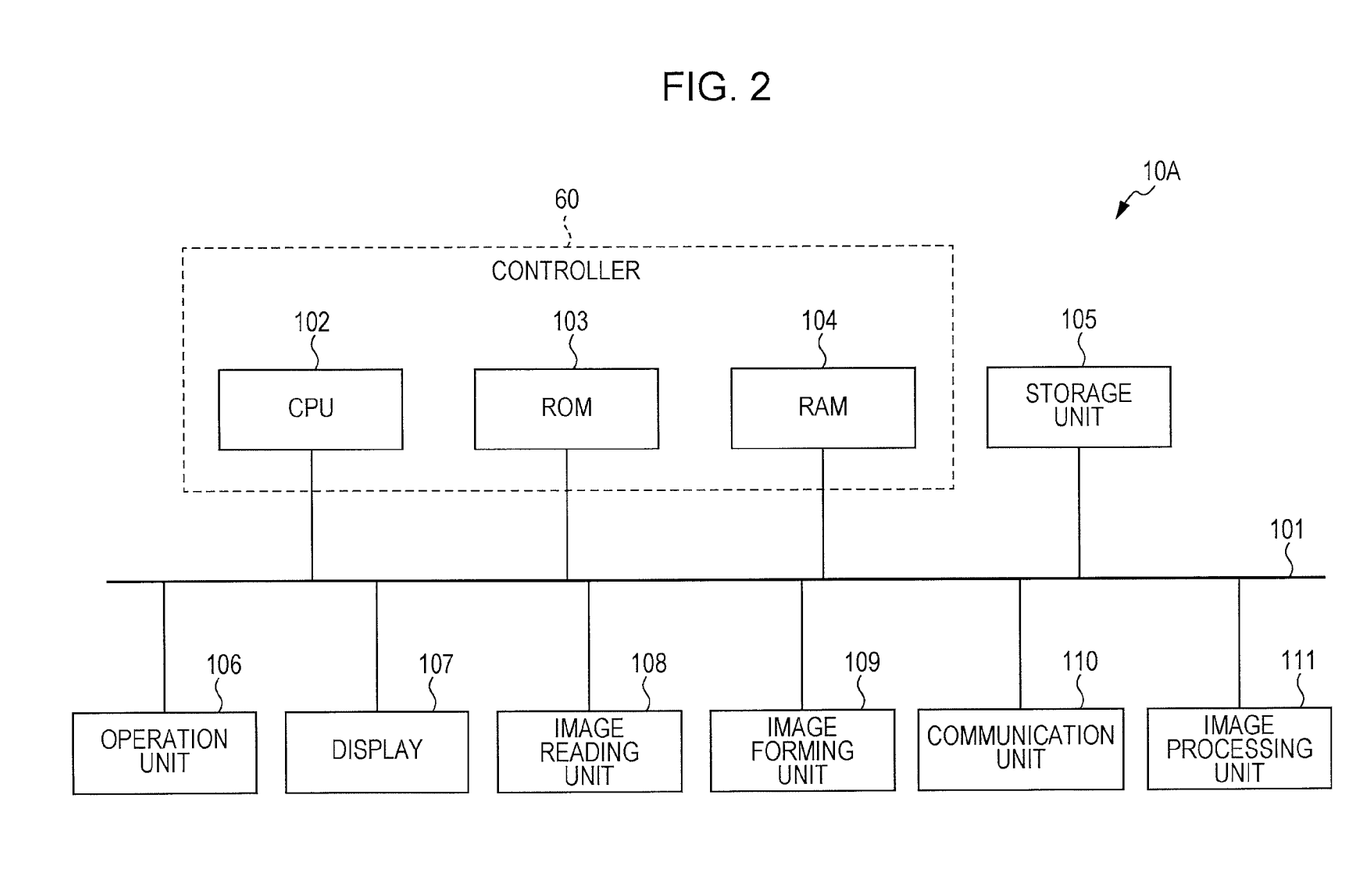
FIG. 2 is a block diagram illustrating a hardware configuration of an image forming apparatus.

FIG. 2 is a block diagram illustrating a hardware configuration of the image forming apparatus 10A. The image forming apparatuses 10B and 10C are configured similarly to the image forming apparatus 10A.

As illustrated in FIG. 2, the image forming apparatus 10A includes a central processing unit (CPU) 102, a read-only memory (ROM) 103, a random access memory (RAM) 104, a storage unit 105, an operation unit 106, a display 107, an image reading unit 108, an image forming unit 109, a communication unit 110, and an image processing unit 111. These units are connected to a bus 101 and exchange data via the bus 101.

The operation unit 106 accepts a user operation. The operation unit 106 is constituted by hardware keys or a touch panel that outputs a control signal corresponding to a position to which pressure is applied, for example.

The display 107 is constituted by a liquid crystal display, for example, and displays data relating to the image forming apparatus 10A in accordance with control performed by the CPU 102. The display 107 also displays a menu screen referred to by the user when the user operates the image forming apparatus 10A.

The image reading unit 108 is constituted by a scanner, reads an image on a loaded document, and generates a read image (image data).

The image forming unit 109 forms a toner image that corresponds to the image data on a sheet by using an electrophotographic system, for example. The image forming unit 109 may form an image by using other systems, such as an ink jet head system.

The communication unit 110 is connected to the communication line 40 (see FIG. 1) and functions as a communication interface for communicating with other apparatuses that are connected to the communication line 40.

The image processing unit 111 performs image processing, such as color correction, tone correction, and so on, on the image represented by the image data.

The storage unit 105 is constituted by a storage device, such as a hard disk drive, and stores data received by the communication unit 110 and the read image generated by the image reading unit 108. As described below, the storage unit 105 functions as a memory and stores at least one piece of information described below and another piece of information in association with each other.

The CPU 102, the ROM 103, and the RAM 104 constitute a controller 60, which controls the units in the image forming apparatus 10A.

The ROM 103 stores therein a control program executed by the CPU 102. The CPU 102 reads the control program stored in the ROM 103 and executes the control program while using the RAM 104 as a work area.

The CPU 102 executes the control program to control the units in the image forming apparatus 10A. Accordingly, the image forming apparatus 10A forms an image on a sheet, or reads a document and generates a read image of the document, for example.

Figure 3:
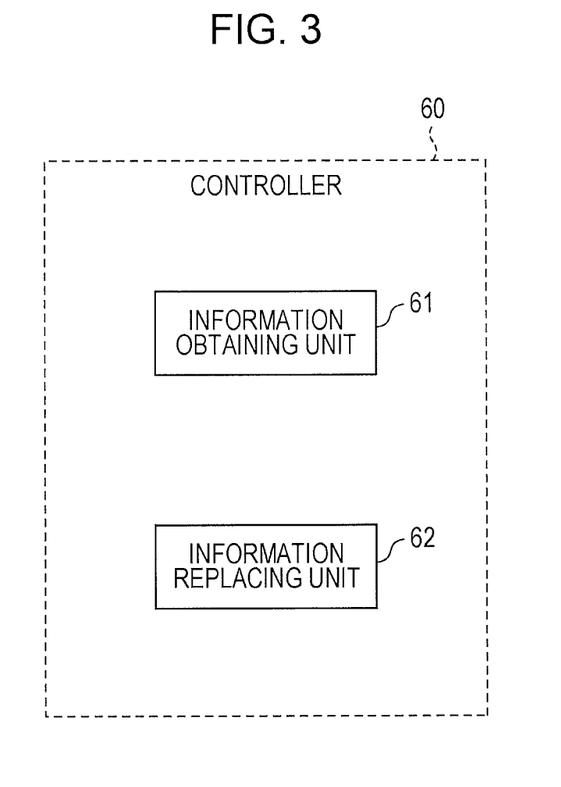
FIG. 3 is a block diagram illustrating a functional configuration of a controller.

In this exemplary embodiment, when the control program is executed by the CPU 102, the controller 60 functions as an information obtaining unit 61 and an information replacing unit 62 as illustrated in FIG. 3, which is a block diagram illustrating a functional configuration of the controller 60.

The information obtaining unit 61 and the information replacing unit 62 illustrated in FIG. 3 are implemented by software and hardware resources cooperating with each other.

Specifically, in this exemplary embodiment, an operating system, an application software program that is executed in cooperation with the operating system, and so on are stored in the ROM 103 or the storage unit 105 (see FIG. 2). In this exemplary embodiment, the CPU 102 (see FIG. 2) loads the programs from the ROM 103 or the like to the RAM 104, which is a main memory, and executes the programs to thereby implement the functional units, namely, the information obtaining unit 61 and the information replacing unit 62.

Here, the programs executed by the CPU 102 may be stored in a computer-readable recording medium, such as a magnetic recording medium (a magnetic tape, a magnetic disk, or the like), an optical recording medium (an optical disk or the like), a magneto-optical recording medium, or a semiconductor memory, and may be provided to the image forming apparatus 10A from the computer-readable recording medium.

The programs executed by the CPU 102 may be downloaded to the image forming apparatus 10A via a communication system, such as the Internet.

Figure 4:
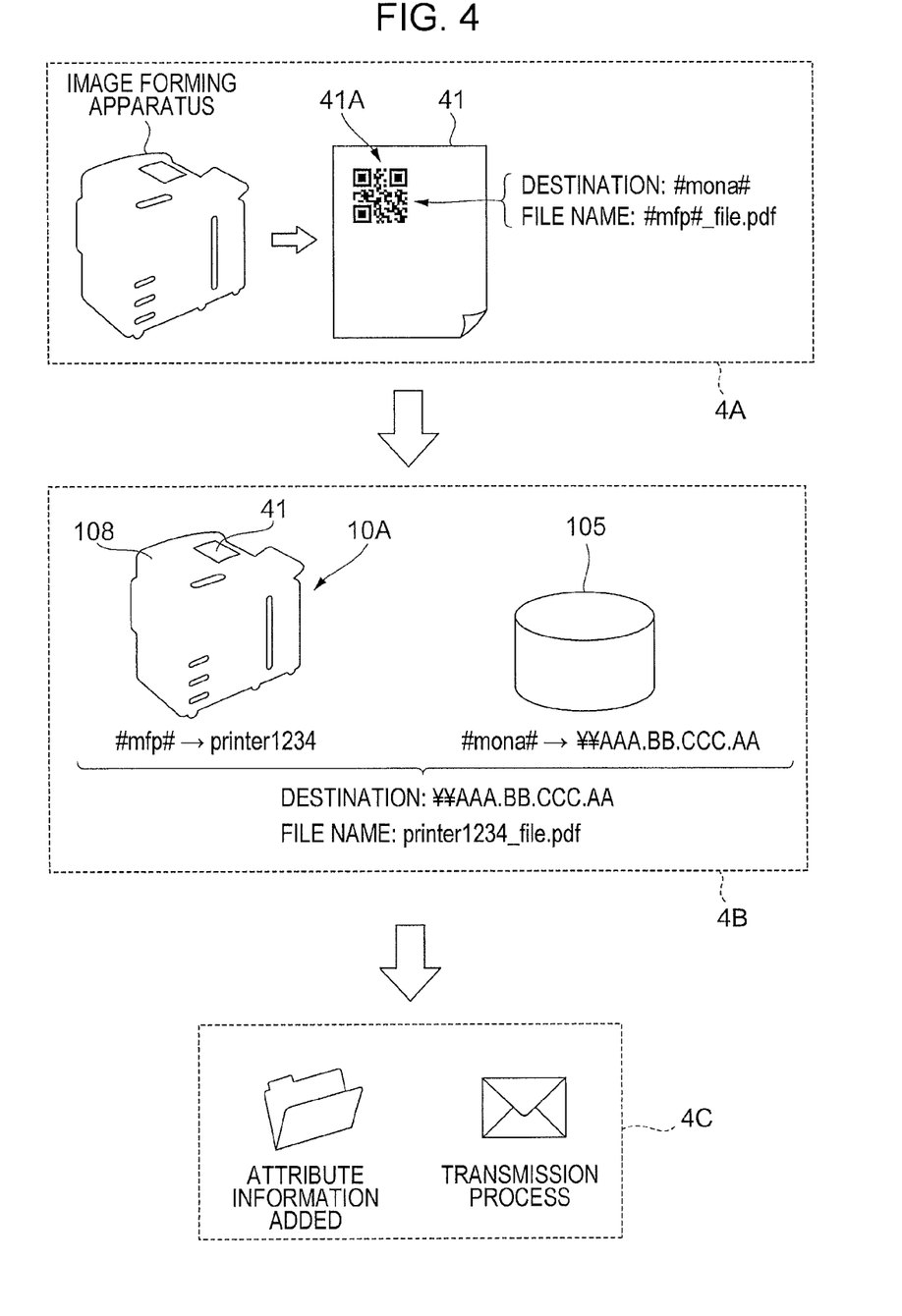
FIG. 4 is a diagram illustrating a specific example of a series of processes.

FIG. 4 is a diagram illustrating a specific example of a series of processes performed in this exemplary embodiment.

In this exemplary embodiment, a process denoted by reference numeral 4A is performed first.

In the process denoted by reference numeral 4A, the user first generates a document image by operating the computer apparatus 30A (see FIG. 1), for example. The user prints the document image on a sheet by using an image forming apparatus. As a result, a document denoted by reference numeral 41 (hereinafter referred to as "document 41") is generated.

The document 41 may be generated by using any of the image forming apparatus 10A to 10C illustrated in FIG. 1 or another image forming apparatus not illustrated in FIG. 1.

Here, the document 41 has a code image 41A formed thereon. The code image 41A stores information therein.

Specifically, the code image 41A stores therein information "#mona#", which is information indicating a destination of a read image (described below) obtained as a result of reading the document 41.

The code image 41A also stores therein information "#mfp#_file.pdf", which is information indicating the file name assigned to the read image obtained as a result of reading the document 41.

In this exemplary embodiment, a two-dimensional barcode, such as a QR code (registered trademark), is used as the code image 41A, which is merely an example. Another type of barcode, such as a one-dimensional barcode, may be used.

Thereafter, a process denoted by reference numeral 4B is performed in this exemplary embodiment.

In the process denoted by reference numeral 4B, the document 41 having the code image 41A formed thereon is loaded to the image reading unit 108 (image reader) of the image forming apparatus 10A, and the image reading unit 108 reads the document 41. As a result, a read image (image data) of the document 41 is obtained at the image forming apparatus 10A.

In this exemplary embodiment, thereafter, the information obtaining unit 61 (see FIG. 3), which is an example of an obtaining unit, analyzes the code image 41A included in the read image and obtains one or more pieces of information included in the code image 41A.

Subsequently, the information replacing unit 62 (see FIG. 3), which is an example of a replacing unit, replaces at least one piece of information among the one or more pieces of information obtained by the information obtaining unit 61 with another pieces of information.

More specifically, the information replacing unit 62 replaces at least one piece of information among the one or more pieces of information with another piece of information that is associated in advance with the at least one piece of information and that has a larger amount of information than that of the at least one piece of information.

Here, a section in which the information obtaining unit 61 and the information replacing unit 62 are provided may be regarded as an information processing apparatus that processes information relating to a code image. A section in which the image reading unit 108, the information obtaining unit 61, and the information replacing unit 62 are provided may be regarded as an image reading apparatus that reads an image of a document.

In this exemplary embodiment, at least one piece of information described above and another piece of information described above are stored in association with each other in the storage unit 105 (see FIG. 2), which functions as the memory. The information replacing unit 62 replaces at least one piece of information described above with another piece of information in accordance with the pieces of information stored in the storage unit 105 (by referring to the storage unit 105).

In this exemplary embodiment, specifically, the information obtaining unit 61 analyzes the code image 41A to thereby obtain the information "#mona#" and information "#mfp#".

The information replacing unit 62 replaces the information "#mona#" with information "YYAAA.BB.CCC.AA", which is information indicating a destination of the read image.

The information replacing unit 62 replaces the information "#mfp#" with information "printer1234", which is information for identifying the image forming apparatus 10A that has obtained the read image.

Specifically, the image forming apparatuses 10A to 10C are each assigned identification information for identifying and distinguishing from other image forming apparatuses each of the image forming apparatuses 10A to 10C, and the information replacing unit 62 replaces the information "#mfp#" with the information "printer1234", which is identification information assigned to the image forming apparatus 10A.

Further, in this exemplary embodiment, the information replacing unit 62 generates a file name "printer1234_file.pdf", which serves as the file name of the read image, on the basis of the information "printer1234", which is information for identifying the image forming apparatus 10A.

Thereafter, a process denoted by reference numeral 4C is performed in this exemplary embodiment.

In the process denoted by reference numeral 4C, a transmission process of transmitting the file (read image) named "printer1234_file.pdf" is performed.

This transmission process is performed by the communication unit 110 (see FIG. 2). In the transmission process, the information "¥¥AAA.BB.CCC.AA" obtained as a result of the replacement process described above is set as the destination, and the read image is transmitted to the destination.

Further, in the process denoted by reference numeral 4C, the information "printer1234_file.pdf", which is information indicating the file name, is added to the read image. In other words, the file name is added to the read image as attribute information. The read image to which the attribute information has been added is transmitted to the destination "¥¥AAA.BB.CCC.AA".

In the series of processes according to this exemplary embodiment, it is possible to make the above-described code image 41A formed on the document 41 smaller.

In this exemplary embodiment, when the code image 41A is generated, the information "#mona#" and the information "mfp" respectively having smaller amounts of information than those of the information "printer1234" and the information "¥¥AAA.BB.CCC.AA" are stored in the code image 41A instead of the information "printer1234" and the information "¥¥AAA.BB.CCC.AA".

In other words, pieces of information based on which the code image is generated are not the information "printer1234" or the information "¥¥AAA.BB.CCC.AA" but the information "#mona#" and the information "mfp" respectively having smaller amounts of information than those of the former pieces of information.

As a result, in this exemplary embodiment, the amount of information stored in the code image 41A is reduced, and the code image 41A is made smaller accordingly. Further, an area on which a document image is formed becomes larger on the document 41.

In this exemplary embodiment, at the image forming apparatus 10A that decodes the code image 41A, at least one piece of information among one or more pieces of information obtained from the code image 41A is replaced by another piece of information having a larger amount of information than that of the at least one piece of information in a similar manner as replacement of "#mona#" by "¥¥AAA.BB.CCC.AA" and replacement of "#mfp#" by "printer1234".

In this exemplary embodiment, at least one piece of information described above which is obtained from the code image 41A and another piece of information described above which replaces the at least one piece of information are stored in association with each other in the storage unit 105, and the information replacing unit 62 replaces the at least one piece of information with the other piece of information in accordance with the pieces of information stored in the storage unit 105.

In this exemplary embodiment, the code image 41A is generated by replacing at least one piece of information among one or more pieces of information, based on which the code image 41A is generated, by another piece of information having a smaller amount of information than that of the at least one piece of information; however, the code image 41A may be generated by reducing the amounts of information of all of the one or more pieces of information based on which the code image 41A is generated.

In the above description, the case of replacing at least one piece of information among one or more pieces of information obtained from the code image 41A (as a result of decoding) by another piece of information having a larger amount of information is described, for example; however, all of the one or more pieces of information obtained from the code image 41A may be replaced by other pieces of information.

In this exemplary embodiment, at least one piece of information described above and another piece of information described above are stored in the storage unit 105 of the image forming apparatus 10A; however, at least one piece of information described above and another piece of information described above may be stored in the server apparatus 20.

In this case, one or more pieces of information obtained as a result of analyzing (decoding) the code image 41A may be transmitted to the server apparatus 20 from the image forming apparatus 10A, for example. The server apparatus 20 may perform replacement and return one or more pieces of information obtained as a result of replacement to the image forming apparatus 10A.

Alternatively, a read image obtained at the image forming apparatus 10A may be transmitted to the server apparatus 20, and the server apparatus may perform a decoding process and a replacement process. Thereafter, the server apparatus 20 may transmit information obtained as a result of replacement to the image forming apparatus 10A.

Figure 5:
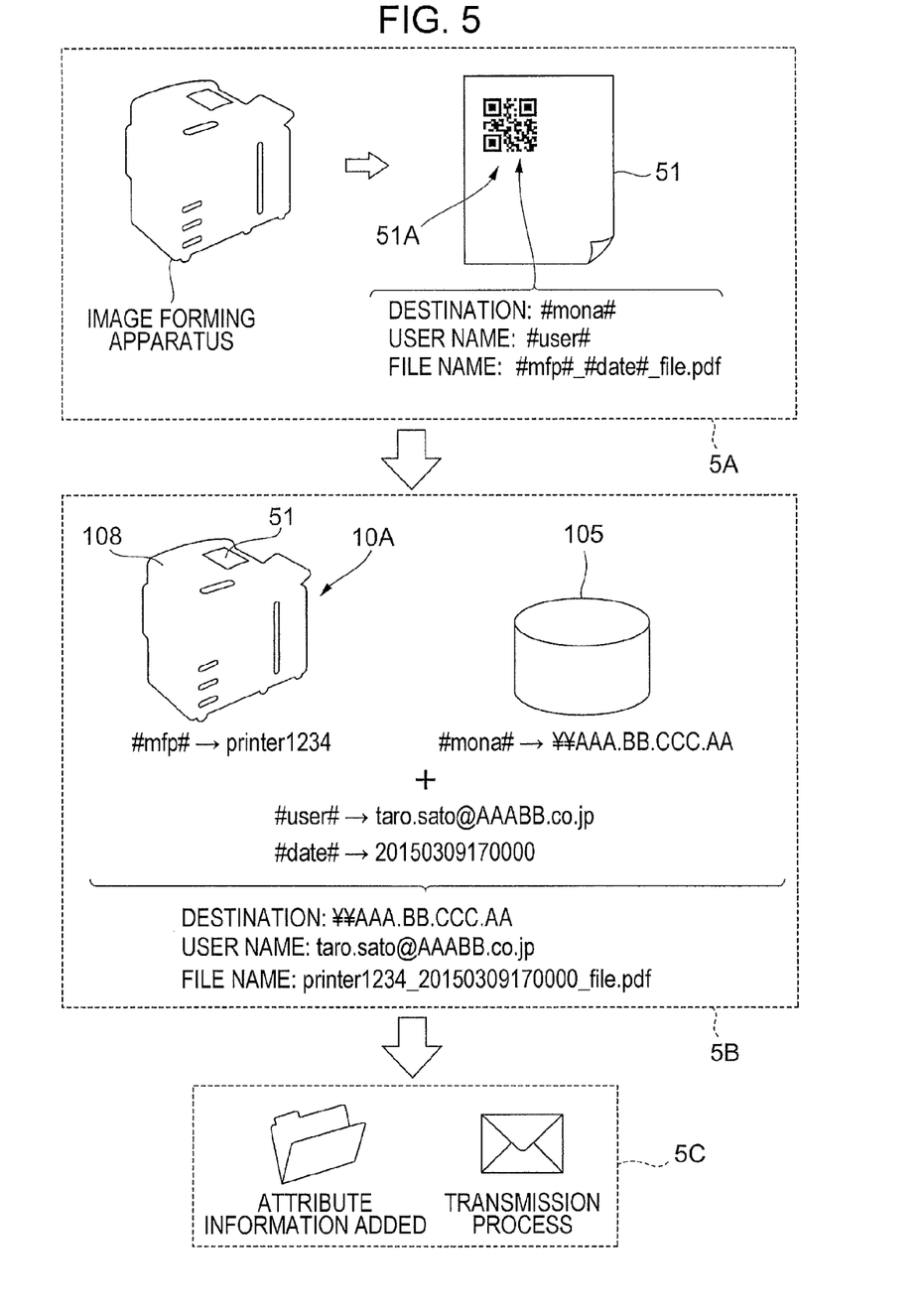
FIG. 5 is a diagram illustrating another example of the series of processes.

FIG. 5 is a diagram illustrating another example of the series of processes.

In this example of the series of processes, the user first generates a document image by operating the computer apparatus 30A in a process denoted by reference numeral 5A as in the above-described specific example and prints the document image on a sheet by using an image forming apparatus. As a result, a document denoted by reference numeral 51 (hereinafter referred to as "document 51") is generated.

Here, the document 51 has a code image 51A formed thereon as in the above-described specific example. The code image 51A stores therein pieces of information.

Specifically, the code image 51A stores therein information "#mona#", which is information indicating a destination of a read image as in the above-described specific example.

The code image 51A also stores therein information "#mfp#_#date#_file.pdf", which is information indicating the file name assigned to the read image.

The code image 51A further stores therein information "#user#", which indicates the user name (sender name).

Subsequently, a process denoted by reference numeral 5B is performed in this exemplary embodiment.

In the process denoted by reference numeral 5B, the document 51 having the code image 51A formed thereon is loaded to the image reading unit 108 of the image forming apparatus 10A, and the image reading unit 108 reads the document 51 as in the above-described specific example. As a result, a read image (image data) of the document 51 is generated.

In this exemplary embodiment, the information obtaining unit 61 thereafter analyzes the code image 51A included in the read image and obtains one or more pieces of information included in the code image 51A as in the above-described specific example.

In this example, the information "#mona#", which is information indicating a destination of the read image, is obtained. The information "#mfp#_#date#_file.pdf", which is information indicating the file name, is also obtained. Further, the information "#user#", which is information indicating the user name, is obtained.

Subsequently, the information replacing unit 62 replaces at least one piece of information among the pieces of information obtained by the information obtaining unit 61 with another piece of information as in the above-described specific example.

More specifically, the information replacing unit 62 replaces at least one piece of information among the pieces of information with another piece of information that is associated in advance with the at least one piece of information and that has a larger amount of information than that of the at least one piece of information.

Specifically, the information replacing unit 62 replaces the information "#mona#" with information "¥¥AAA.BB.CC.AA", which is information indicating a destination of the read image.

The information replacing unit 62 replaces the information "#mfp#" with information "printer1234", which is information for identifying the image forming apparatus 10A that has obtained the read image.

The information replacing unit 62 further replaces the information "#user#" with "taro.sato@AAABB.co.jp", which is the user name of the user who has operated the image forming apparatus 10A (the user who has used the image forming apparatus 10A to read the document 51 and who is to transmit the read image).

In this example, the user name (taro.sato@AAABB.co.jp) that replaces "#user#" is obtained from an integrated circuit (IC) card owned by the user, for example.

More specifically, the image forming apparatuses 10A to 10C in this exemplary embodiment are each equipped with a card reader (not illustrated). When the users operate the image forming apparatuses 10A to 10C, the IC cards owned by the respective users are read by the respective card readers, and the user names are obtained. In other words, the users are allowed to operate the image forming apparatuses 10A to 10C after completion of authentication processing using the IC cards. The user name described above is obtained from the IC card used in the authentication processing.

The information replacing unit 62 further replaces information "#date#" with information "20150309170000", which is information regarding the date and time when the read image was obtained.

Specifically, the information replacing unit 62 replaces the information "#date#" with the information "20150309170000", which is information indicating the date and time when the document 51 was scanned at the image forming apparatus 10A. Here, the image forming apparatuses 10A to 10C are each equipped with a time-of-day clock (not illustrated), and the date and time when the read image was obtained is obtained from the time-of-day clock.

Further, in this exemplary embodiment, the information replacing unit 62 generates a file name "printer1234_20150309170000_file.pdf", which serves as the file name of the read image, on the basis of the information "printer1234", which is information for identifying the image forming apparatus 10A, and the information "20150309170000", which is information regarding the date and time when the read image was obtained.

Thereafter, a process denoted by reference numeral 5C is performed in this exemplary embodiment.

In the process denoted by reference numeral 5C, the information "taro.sato@AAABB.co.jp", which is information indicating the user name, and the information "printer1234_20150309170000_file.pdf", which is information indicating the file name, are added to the read image. In other words, attribute information, such as information regarding the user name (information regarding the sender) and information regarding the file name, is added to the read image.

The read image to which the attribute information has been added is transmitted to the destination "¥¥AAA.BB.CC.AA".

In the series of processes illustrated in FIG. 5, another piece of information that replaces at least one piece of information does not have a fixed value (is not unchanged information) but changes.

Specifically, another piece of information changes dynamically in accordance with the user who reads the document 51 at the image forming apparatus 10A and the date and time when the document 51 is read at the image forming apparatus 10A.

Figure 6:
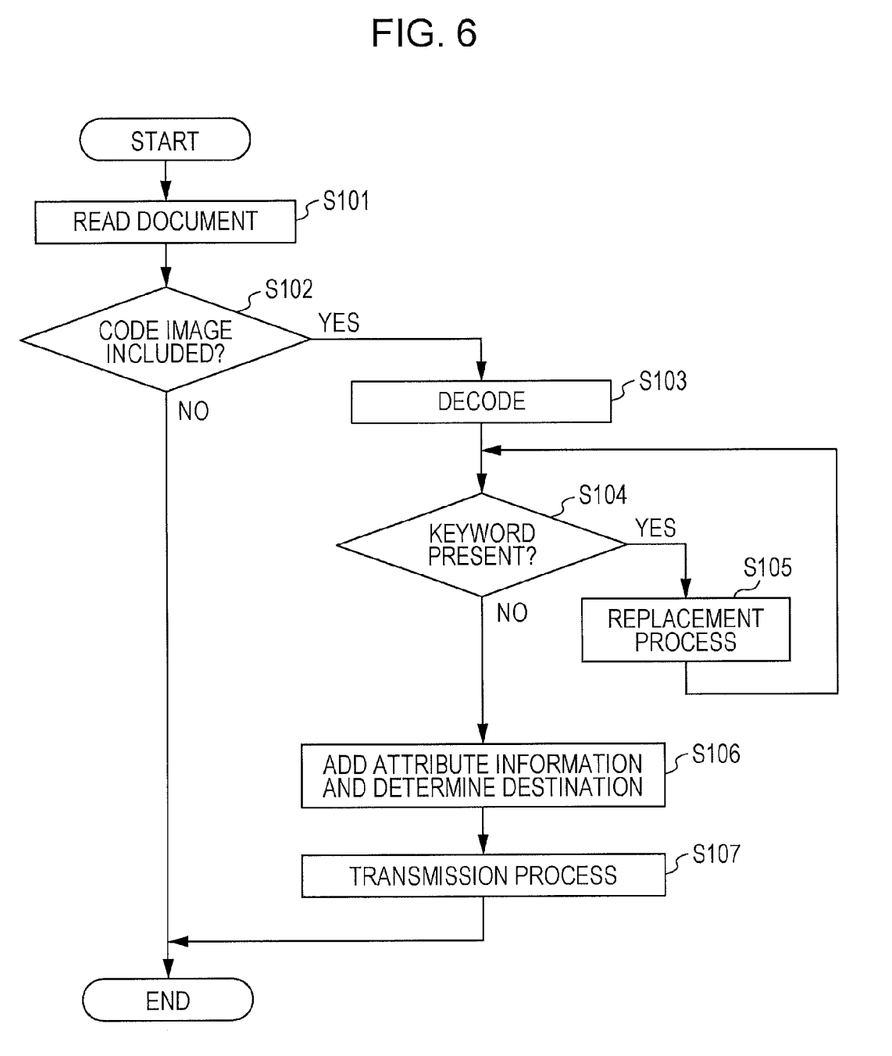
FIG. 6 is a flowchart illustrating a flow of the series of processes performed at the image forming apparatus.

FIG. 6 is a flowchart illustrating a flow of the above-described series of processes performed at the image forming apparatus 10A.

In this exemplary embodiment, as described above, a document is loaded to the image reading unit 108 of the image forming apparatus 10A, and an image of the document is read first (step S101). Next, the information obtaining unit 61 scans the read image and determines whether a code image is included in the read image (step S102). If it is determined that a code image is not included (No in step S102), the series of processes ends.

On the other hand, if it is determined that a code image is included (Yes in step S102), the information obtaining unit 61 decodes the code image (analyzes the code image) (step S103) and obtains one or more pieces of information stored in the code image.

Next, the information replacing unit 62 determines whether a keyword among predetermined keywords is present in the one or more pieces of information obtained by the information obtaining unit 61 (step S104). In other words, the information replacing unit 62 determines whether the one or more pieces of information obtained by the information obtaining unit 61 include at least one piece of information described above.

If a keyword among the predetermined keywords is present (Yes in step S104), the information replacing unit 62 replaces the keyword (at least one piece of information) with another piece of information that is associated in advance with the at least one piece of information (step S105).

In step S104, the information replacing unit 62 determines again whether a keyword among the predetermined keywords which has not been replaced is present. If a keyword that has not been replaced is present (Yes in step S104), the process in step S105 is performed again. On the other hand, if a keyword that has not been replaced is not present (No in step S104), the flow proceeds to step S106.

In the process in step S106, attribute information, such as information regarding the user name (information regarding the sender) and information regarding the file name, is added to the read image as described above. Further, in the process in step S106, a destination of the read image is determined.

Thereafter, in step S107, the read image is transmitted to the destination determined in step S106.

Figure 7A:
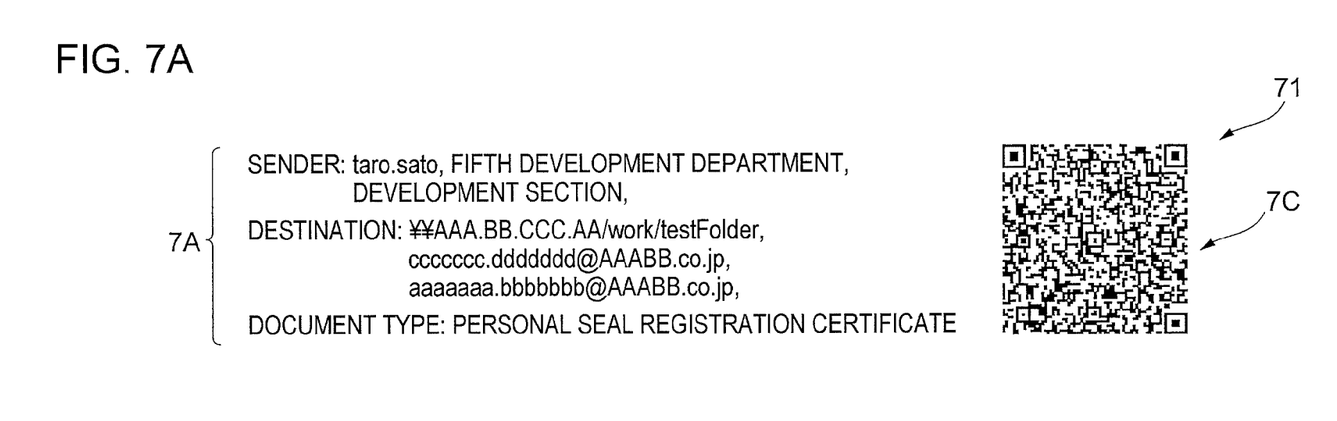
FIG. 7A and FIG. 7B are diagrams for describing another specific example of the series of processes.
Figure 7B:
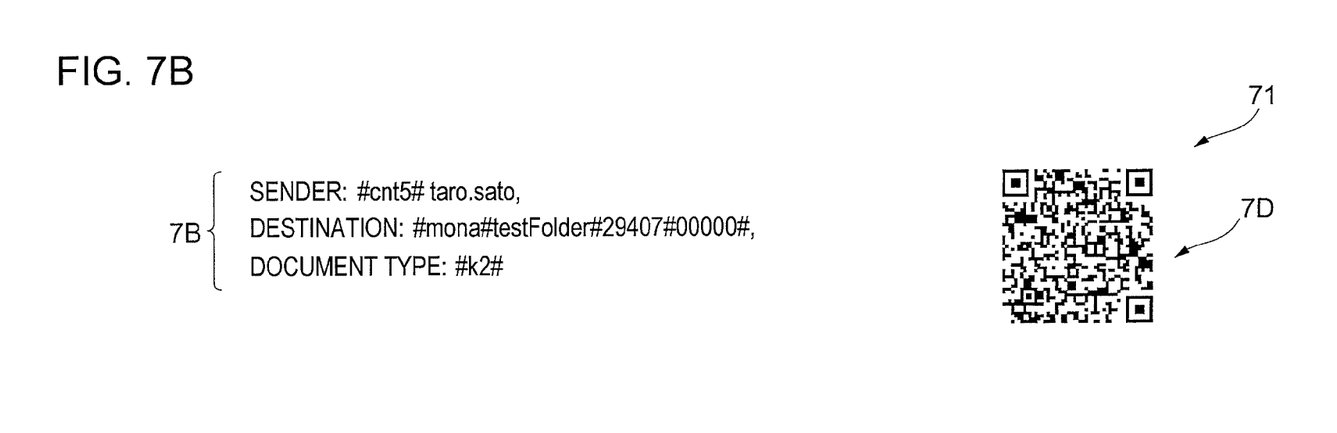

FIGS. 7A and 7B are diagrams for describing another specific example of the series of processes in this exemplary embodiment.

FIG. 7A is a diagram illustrating a code image 71 formed on a document in a comparative example.

In this comparative example, pieces of information, based on which the code image is generated, are stored in the code image 71 as is. Specifically, pieces of information denoted by reference numeral 7A are stored as is. In this case, the code image 71 has a size denoted by reference numeral 7C as illustrated in FIG. 7A.

On the other hand, in the series of processes in this exemplary embodiment, pieces of information denoted by reference numeral 7B respectively having smaller amounts of information than in the comparative example are stored in the code image 71 as illustrated in FIG. 7B. As a result, the code image 71 has a smaller size denoted by reference numeral 7D as illustrated in FIG. 7B.

Now, a process performed at any of the computer apparatuses 30A to 30C (see FIG. 1) that is operated by the user for creating a document is described.

When the user creates a document (when the user creates a code image), a mode may be employed in which the user directly inputs into one of the computer apparatuses 30A to 30C one or more pieces of information originally having smaller amounts of information. Specifically, in this mode, the user may directly input into one of the computers 30A to 30C the above-described "#mona#", "#mfp#", and so on by using a keyboard or the like.

In another mode, a table, in which an association between at least one piece of information and another piece of information described above is recorded, may be stored in advance in each of the computer apparatuses 30A to 30C, and each of the computer apparatuses 30A to 30C may refer to the table and replace a piece of information input by the user with another piece of information having a smaller amount of information than that of the input piece of information.

Figure 8:
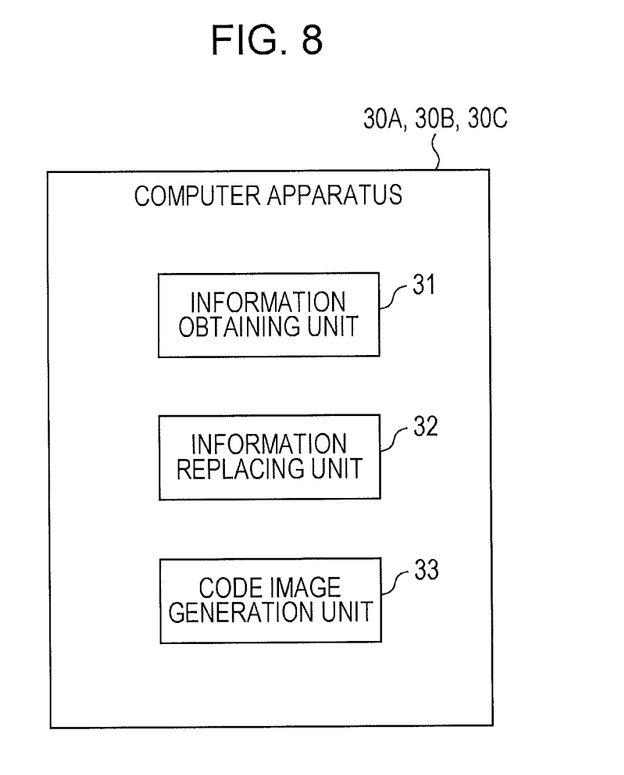
FIG. 8 is a functional block diagram of computer apparatuses.

FIG. 8 is a functional block diagram of the computer apparatuses 30A to 30C. FIG. 8 illustrates an information obtaining unit 31, an information replacing unit 32, and a code image generation unit 33, which correspond to a functional block relating to generation of a code image.

When replacement of a piece of information is performed at a computer apparatus among the computer apparatuses 30A to 30C, the information obtaining unit 31, which is an example of an obtaining unit, first obtains, from the user, one or more pieces of information based on which a code image is generated. Specifically, the information obtaining unit 31 obtains, from the user, one or more pieces of information, based on which a code image is generated, on the basis of information input by the user using a keyboard, for example.

Next, the information replacing unit 32, which is an example of a replacing unit, replaces at least one piece of information among the one or more pieces of information obtained by the information obtaining unit 31 with another piece of information that is associated in advance with the at least one piece of information and that has a smaller amount of information than that of the at least one piece of information.

Specifically, the information replacing unit 32 refers to the table in which an association between the at least one piece of information and another piece of information is recorded and replaces information "¥¥AAA.BB.CCC.AA", which is information indicating a destination of a read image, with information "#mona#", for example.

Next, the code image generation unit 33, which is an example of a code image generator, generates a code image on the basis of the obtained one or more pieces of information among which the at least one piece of information has been replaced by the other piece of information.

Thereafter, at the computer apparatus among the computer apparatuses 30A to 30C, the generated code image is incorporated into a document image. Subsequently, the document image is output to an image forming apparatus (not illustrated), and a document described above (a document on which the code image is formed) is obtained.

Here, each of the computer apparatuses 30A to 30C may be regarded as a code image generation apparatus that generates a code image.

Note that either replacement of at least one piece of information with another piece of information or generation of a code image or both the replacement and the generation performed at the computer apparatuses 30A to 30C may be performed at the server apparatus 20.

Specifically, one or more pieces information input by the user using a keyboard provided to a computer apparatus among the computer apparatuses 30A to 30C may be transmitted to the server apparatus 20, and at least one piece of information among the one or more pieces of information may be replaced by another piece of information at the server apparatus 20, for example. The other piece of information that has replaced the at least one piece of information may be returned to the computer apparatus among the computer apparatuses 30A to 30C.

In another example of the process, one or more pieces of information input into a computer apparatus among the computer apparatuses 30A to 30C by the user using a keyboard may be transmitted to the server apparatus 20, and at least one piece of information among the one or more pieces of information may be replaced by another piece of information at the server apparatus 20. Further, a code image may be generated at the server apparatus 20. The generated code image may be returned to the computer apparatus among the computer apparatuses 30A to 30C.

The functional units implemented in the computer apparatuses 30A to 30C, namely, the information obtaining unit 31, the information replacing unit 32, and the code image generation unit 33, are implemented by software and hardware resources cooperating with each other.

Specifically, an operating system, an application software program that is executed in cooperation with the operating system, and so on are stored in a ROM (not illustrated) or a storage unit (not illustrated) provided in each of the computer apparatuses 30A to 30C. A CPU (not illustrated) loads these programs from the ROM or the like to a RAM (not illustrated), which is a main memory, and executes the programs to thereby implement the functional units, namely, the information obtaining unit 31, the information replacing unit 32, and the code image generation unit 33.

Here, the programs executed by the CPU may be stored in a computer-readable recording medium, such as a magnetic recording medium (a magnetic tape, a magnetic disk, or the like), an optical recording medium (an optical disk or the like), a magneto-optical recording medium, or a semiconductor memory, and may be provided to the computer apparatuses 30A to 30C from the computer-readable recording medium. The programs may be downloaded to the computer apparatuses 30A to 30C via a communication system, such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an obtaining unit that obtains one or more pieces of information obtained from a code image included in a read image of a document; and
a replacing unit that:
determines that a keyword is present in the one or more pieces of information obtained by the obtaining unit by matching at least one piece of information of the one or more pieces of information with the keyword stored in a database; and
replaces the determined keyword among the one or more pieces of information obtained by the obtaining unit with another piece of information which is associated in advance with the keyword and which has a larger amount of information than an amount of information of the at least one piece of information.

2. The information processing apparatus according to claim 1, further comprising:
a memory that stores the keyword and the other piece of information in association with each other, wherein
the replacing unit replaces the keyword with the other piece of information in accordance with the pieces of information stored in the memory.

3. The information processing apparatus according to claim 2, wherein
the replacing unit replaces the keyword with one of information regarding a date and time when the read image is obtained, information regarding a sender who transmits the read image, and information regarding a destination of the read image.

4. The information processing apparatus according to claim 2, wherein
the replacing unit replaces the keyword with information for identifying the information processing apparatus.

5. The information processing apparatus according to claim 1, wherein
the replacing unit replaces the keyword with one of information regarding a date and time when the read image is obtained, information regarding a sender who transmits the read image, and information regarding a destination of the read image.

6. The information processing apparatus according to claim 1, wherein
the replacing unit replaces the keyword with information for identifying the information processing apparatus.

7. A non-transitory computer readable medium storing a program causing a computer to execute a process for information processing, the process comprising:
obtaining one or more pieces of information obtained from a code image included in a read image of a document;
determining that a keyword is present in the obtained one or more pieces of information by matching at least one piece of information of the obtained one or more pieces of information with the keyword stored in a database; and
replacing the determined keyword among the obtained one or more pieces of information with another piece of information that is associated in advance with the keyword and that has a larger amount of information than an amount of information of the at least one piece of information.

8. An image reading apparatus comprising:
an image reader that reads an image on a document;
an obtaining unit that obtains, from a code image included in the image read by the image reader, one or more pieces of information included in the code image; and
a replacing unit that:
determines that a keyword is present in the one or more pieces of information obtained by the obtaining unit by matching at least one piece of information of the one or more pieces of information with the keyword stored in a database; and
replaces the determined keyword among the one or more pieces of information obtained by the obtaining unit with another piece of information which is associated in advance with the keyword and which has a larger amount of information than an amount of information of the at least one piece of information.

9. A code image generation apparatus comprising:
an obtaining unit that obtains one or more pieces of information based on which a code image is generated;
a replacing unit that replaces at least one piece of information among the one or more pieces of information obtained by the obtaining unit with a keyword that has a smaller amount of information than an amount of information of the at least one piece of information, wherein the keyword is used to query a database to determine if the keyword matches the at least one piece of information; and
a code image generator that generates a code image in accordance with the obtained one or more pieces of information among which the at least one piece of information has been replaced by the keyword.

10. The code image generation apparatus according to claim 9, wherein the code image generated by the code image generator using the keyword is smaller in size than if the code image generator generated a code image using the at least one piece of information.

11. A non-transitory computer readable medium storing a program causing a computer to execute a process for code image generation, the process comprising:
obtaining one or more pieces of information based on which a code image is generated;
replacing at least one piece of information among the obtained one or more pieces of information with a keyword that has a smaller amount of information than an amount of information of the at least one piece of information, wherein the keyword is used to query a database to determine if the keyword matches the at least one piece of information; and
generating a code image in accordance with the obtained one or more pieces of information among which the at least one piece of information has been replaced by the keyword.

12. The non-transitory computer readable medium according to claim 11, wherein the code image generated using the keyword is smaller in size than a code image that is generated using the at least one piece of information.

* * * * *